United States Patent [19]

Baird et al.

[11] Patent Number: 5,226,143
[45] Date of Patent: Jul. 6, 1993

[54] MULTIPROCESSOR SYSTEM INCLUDES OPERATING SYSTEM FOR NOTIFYING ONLY THOSE CACHE MANAGERS WHO ARE HOLDERS OF SHARED LOCKS ON A DESIGNATED PAGE BY GLOBAL LOCK MANAGER

[75] Inventors: Robert Baird, San Jose, Calif.; Gerald P. Bozman, Oakland, N.J.; Alexander S. Lett, Mahopac, N.Y.; James J. Myers, San Francisco, Calif.; William H. Tetzlaff, Mount Kisco, N.Y.

[73] Assignee: International Business Machines Corporation, Armonk, N.Y.

[21] Appl. No.: 493,581

[22] Filed: Mar. 14, 1990

[51] Int. Cl.$^5$ .............................................. G06F 15/16
[52] U.S. Cl. ..................................... 395/425; 395/650; 364/DIG. 1; 364/228; 364/228.1; 364/243; 364/243.4; 364/254.3; 364/246.8
[58] Field of Search ............... 395/425, 250, 325, 425, 395/700, 650, 725; 364/134, 131, 138

[56] References Cited

U.S. PATENT DOCUMENTS

| | | | |
|---|---|---|---|
| 3,400,371 | 9/1968 | Amdahl et al. | 340/172.5 |
| 4,207,609 | 6/1980 | Luiz et al. | 364/200 |
| 4,290,105 | 9/1981 | Cichelli et al. | 364/200 |
| 4,513,367 | 4/1985 | Chan et al. | 395/425 |
| 4,612,612 | 9/1986 | Woffinden et al. | 364/200 |
| 4,716,528 | 12/1987 | Crus et al. | 364/300 |
| 4,843,542 | 6/1989 | Dashiell et al. | 364/200 |
| 4,897,781 | 1/1990 | Chang et al. | 364/200 |
| 4,977,498 | 12/1990 | Rastegar et al. | 364/200 |
| 5,025,366 | 6/1991 | Baror | 395/250 |
| 5,050,072 | 9/1991 | Earnshaw et al. | 395/325 |
| 5,060,144 | 10/1991 | Sipple et al. | 364/200 |
| 5,067,071 | 11/1991 | Schanin et al. | 395/275 |

OTHER PUBLICATIONS

Bozman et al., U.S. Patent Application "Method for Managing a Data Cache Using Virtual External Storage Addresses as Arguments", Ser. No. 07/477,704.
Lorin and Deitel, "Operating Systems", The System Programming Series, copyright 1981 by Addison-Wesley Publishing Co., Chapter 9, Re Resource Management.
Sakti Ghosh, "Database Organization for Data Management", pp. 33-41 copyright 1977 by Academic Press Inc.
C. J. Date, "An Introduction to Database System", 3rd Edition, Part 3 regarding The Hierarchical Approach, pp. 273-386 copyright 1981 by Addison-Wesley Pub. Co.
IBM Publication GC28-1150, "MVS/Extended Architecture System Programming Library: System Macros and Facilities", vol. 1.

Primary Examiner—Robert B. Harrell
Assistant Examiner—Mehmet Geckil
Attorney, Agent, or Firm—R. Bruce Brodie

[57] ABSTRACT

A conditional broadcast or notification facility of a global lock manager is utilized to both serialize access to pages stored in local caches of counterpart processors in a distributed system and to ensure consistency among pages common to the caches. Exclusive use locks are obtained in advance of all write operations. When a page is to be updated, which page is cached in a processor other than that of the requester, then a delay is posed to the grant of the exclusive lock, all shared use lock holders to the same page notified, local copies are invalidated, exclusive lock granted, page is updated and written through cache, after which the lock is demoted to shared use.

3 Claims, 6 Drawing Sheets

STORAGE IN RELATION TO A CPU

MULTIPROCESSOR SYSTEM INCLUDES OPERATING SYSTEM FOR NOTIFYING ONLY THOSE CACHE MANAGERS WHO ARE HOLDERS OF SHARED LOCKS ON A DESIGNATED PAGE BY GLOBAL LOCK MANAGER

FIELD OF THE INVENTION

This invention relates to managing an aspect of computer storage, and more particularly, to methods concurrently managing locking and cache invalidation globally within processor boundaries in a distributed system having local data caches.

DESCRIPTION OF RELATED ART

Distributed System Defined, CPU, and Some Operating Constituents

A "distributed system" for purposes of this invention comprises two or more processors having shared access to an DASD oriented external storage subsystem. Each central processing unit (CPU) processor of such a system typically includes a local operating system (OS), random access memory (RAM)oriented internal store, local instruction and data caches operatively formed from processor internal store, the shared access external store, and lock and cache resource managers.

Applications (processes/tasks) executing on a CPU generate read and write operations by way of the OS. In turn, the read and write operations utilize the data cache and lock resource managers to establish directory lockable access paths to pages either resident in the data cache or as refreshed into the data cache from the shared external store.

Internal and External Store

Because storage costs increase dramatically with speed, many computer systems divide the physical storage subsystem into a number of performance levels. Some of these levels, such as direct access storage device (DASD) and tape, have been treated as shared access peripheral I/O devices and are accessed over an asynchronous path. Other levels, such as RAM and cache, have been treated directly by system hardware and accessed over a synchronous path as part of internal storage.

The term "internal storage" specifies that portion of storage randomly addressable for single read or write transfers. In IBM systems, internal storage is byte addressable except for an extension ("expanded store"). Expanded store is random accessed on a block or page addressable (4096 bytes/page) basis. It is managed as an LRU real memory backed paging store. Lastly, "external storage" refers to that bulk portion of storage that is not randomly addressable and must be directly accessed as on DASD.

Virtual Address and Virtual External Storage Address

In the Bozman et al, U.S. Pat. No. 5,088,026 "A METHOD FOR MANAGING A DATA CACHE USING VIRTUAL EXTERNAL STORAGE ADDRESSES AS ARGUMENTS", filed on Feb. 9, 1990, there was described a method to manage the access pages mapped into a very large virtual external address (VESA) through a cache without disturbing the logical view (virtual name) of the data and without having to assign physical or real backing store to said logical view.

In the copending application, two levels of address indirection are used to avoid both synonym problems and multiple copying of pages common to different logical views (page organized files) of the pages in cache. As used, pages are referenced according to their address in a linear space as mapped into a virtual external storage address (VESA) and then as mapped into a physical address in external storage. In this regard, the referenced pages are written into cache using their VESA addresses as indexing arguments. That is, the pages are written into a cache and indexed (ordered) by their VESA addresses. Then, multiple views can be formed by binding names (VESA addresses) thereto. This avoids having to duplicate copies of common pages and bind said copies to the views.

Resource Managers

As pointed out by Lorin and Deitel, "Operating Systems", The System Programming Series, copyright 1981 by Addison-Wesley Publishing Co., chapter 9 regarding resource management, a "resource manager" is a software OS construct defined on a CPU and given a set of attributes relating to the accessibility of the resource and its physical representation in the system. Lorin further points out that the function of the operating system in this respect is to define an abstract machine composed of abstract resources that are conveniently manipulated by processes. Thus, technical and economic use and coherence of resources are regulated by resource managers.

It should also be appreciated that a resource manager can also be expressed as a "monitor". A monitor is also a software OS construct comprising a collection of procedures associated with a type of resource. It is responsible for allocating the resource and for controlling references to it. Furthermore, each monitor has exclusive access to any tables or other structures containing information about the resource for which it is responsible. The distinctive feature of the monitor is that it contains a section of data that is designed for public use but that cannot be accessed except through the monitor.

Locks and Lock Management

A locking function according to Lorin serializes access by processes to at least one selected system resource other than the processor. A lock manager as a monitor in the context of this invention is a software construct for controlling access to cache stored pages among other resources. This is mandated by the need for coherency among pages and directories in general and among versions of the same page in a distributed system having multiple local data caches in particular.

An operating system such as MVS used in the IBM System/370 includes a hierarchy of locks for various resources in the system. Locks are at least a function of name, scope, and exclusives. With respect to scope, a global lock affects either the entire system or an entire resource. In contrast, a local lock in the storage context may affect only a single address space or a single page or page group. A lock may be exclusive or shared. Shared locks on pages in memory or storage are most often associated with read and copy operations while exclusive locks are associated with write/update and move operations. Also a lock may be promoted or demoted either in scope, exclusivity, or both. By "atomically", it is meant that the system guarantees that a current lock state either is driven to its next state, or remains the same, and that no unplanned intermediate state is possible.

As part of establishing an access path to a cache from a task or process, the cache manager accesses the local or global lock manager as the case admits. Depending upon the nature and scope of the access request and the current state of the lock, the request may be granted in whole or modified form or denied.

Resource managers including cache and lock managers use various tables to indicate the current control state of their resource. The process for grant, modification, or denial of a lock in any particular instance requires the lock manager to access its table and interpret the current state thereof. If the lock state changes in any respect, the lock manager must alter the lock table to reflect that change.

Page level locking is one of the most frequently encountered forms and is the level of pragmatic interest. For purposes of this invention a "page" is any fixed or standard sized information unit that is cached, swapped, and pinned by for instance a demand paging virtual storage system.

Cache and Cache Invalidation

A "cache" may be formed either as a software or hardware resource. It is defined as an indexable LRU ordered collection of pages in a buffer. It is usually positioned in a path to data or instructions so as to minimize access time. If implemented as a software construct, a cache can be located anywhere in processor internal store. Alternatively, an example of a hardware cache may be found in Woffinden et al; U.S. Pat. No. 4,612,612, "Virtually Addressed Cache", issued Sept. 16, 1986. In both the software and hardware form, the cache manager controls the cache through a cache directory and page tables.

Relatedly, the term "cache invalidate" refers to either having the cache manager qua monitor remove the "dirty page" from a cache directory or provide indication that a named page located therein is invalid. Alternatively, the cache manager could cause the updated page to overwrite the current page in cache.

When the base page is altered, shadow writing involves less data movement than overwriting. However, an example of page overwriting may be found in Dashiell et al; U.S. Pat. No. 4,843,542, "Virtual Memory Cache for Use in Multi Processing Systems", filed Nov. 12, 1986, issued Jun. 27, 1989. Dashiell obtains consistency in a multiple processor/virtual cache system using main memory as a backing store by having the requesting processor copy a page update to all caches holding the equivalent of a share lock prior to writing to local cache.

IMS

IMS (Information Management System) is a major hierarchically organized database resident on external storage and operable in a shared access mode to two or more processors. A formal description of a hierarchical view of data and relations may be found in Sakti Ghosh, "Data Base Organization for Data Management" on pages 33–41, copyright 1977 by Academic Press, Inc. A programming IMS description is set out in C.J.Date, "An Introduction to Database Systems", 3rd Edition, Part 3 regarding "The Hierarchical Approach", pp. 273–386, copyright 1981 by Addison-Wesley Publishing Company.

Significantly, it is known to send lock conflict and cache invalidate messages across processor boundaries in a distributed system in which processors would have local resident IMS systems, cache and lock managers.

SUMMARY OF INVENTION

It is an object of this invention to devise a method for concurrently managing locking and cache invalidation globally within processor boundaries in a distributed system having local data caches.

The foregoing object is satisfied by a new use of the communications (notification) facility of a page (block) level lock manager common to two or more processors. The new use both serializes access to and ensures consistency of pages shared in local (software) data caches.

For read operating systems, each processor (cache manager) obtains a share lock on a designated page from a system lock manager. The designated page is either cache accessible, or, may be copied to the local cache from DASD oriented external store.

For contemporaneous write operating systems, all (cache manager) holders of share locks on the designated page are notified by the lock manager, copies of the page are removed from counterpart local caches (cache invalidated) by the counterpart cache manager, the exclusive lock is granted to the requesting processor (cache manager) after the share locks have been relinquished, the processor writes the changed page through the local cache to external store, and the lock state is then atomically demoted to share.

The resolution of a race between two or more write requests (as where P1 update writes page A and P2 update erases page A) is managed by way of establishment of a higher level logical locking convention as among the requesting processors or applications executing thereon.

In contrast to the above described Dashiell patent, the method of the invention uses the condition broadcast (notify on conflict) feature of a global lock manager to notify all caches holding share locks on a designated page of a prospective exclusive (write) lock to be granted. This results in the cache invalidation (erasure) of the page, the grant of the exclusive lock, writing the page update through the local cache to external store, and demoting the lock to share status.

The method of the invention eschews write back of a designated updated page to caches other than that holding the target page copy. This is premised on the low likelihood of immediate references to that updated page across several caches. Thus, it would save cache resource if reliance placed upon refresh being made to the individual cache from the page as located in external storage.

DESCRIPTION OF THE PREFERRED EMBODIMENT

The Host CPU Environment for Executing the Method of the Invention.

The invention can be conveniently practiced in a configuration in which each CPU in the system is an IBM/360 or 370 architected CPU having an IBM MVS operating system. An IBM/360 architected CPU is fully described in Amdahl et al, U.S. Pat. No. 3,400,371, "Data Processing System", issued on Sept. 3, 1968. A configuration involving CPU's sharing access to external storage is set forth in Luiz et al, U.S. Pat. No. 4,207,609, "Path Independent Device Reservation and Reconnection in a Multi CPU and Shared Device Access System", filed May 8, 1978, issued Jun. 10, 1980.

An MVS operating system is also set out in IBM publication GC28-1150, "MVS/Extended Architecture System Programming Library: "System Macros and Facilities", Volume 1. Details of standard MVS or other operating system services such as local lock management, subsystem invocation by interrupt or monitor, and the posting and waiting of tasks is omitted. These OS services are believed well appreciated by those skilled in the art.

Some Relations Among CPU, Caches, and Storage

For purposes of this invention, a page consists of a fixed number of data bytes such as 4096. Also, the term "buffer" is a synonym for "page".

Figure 1:
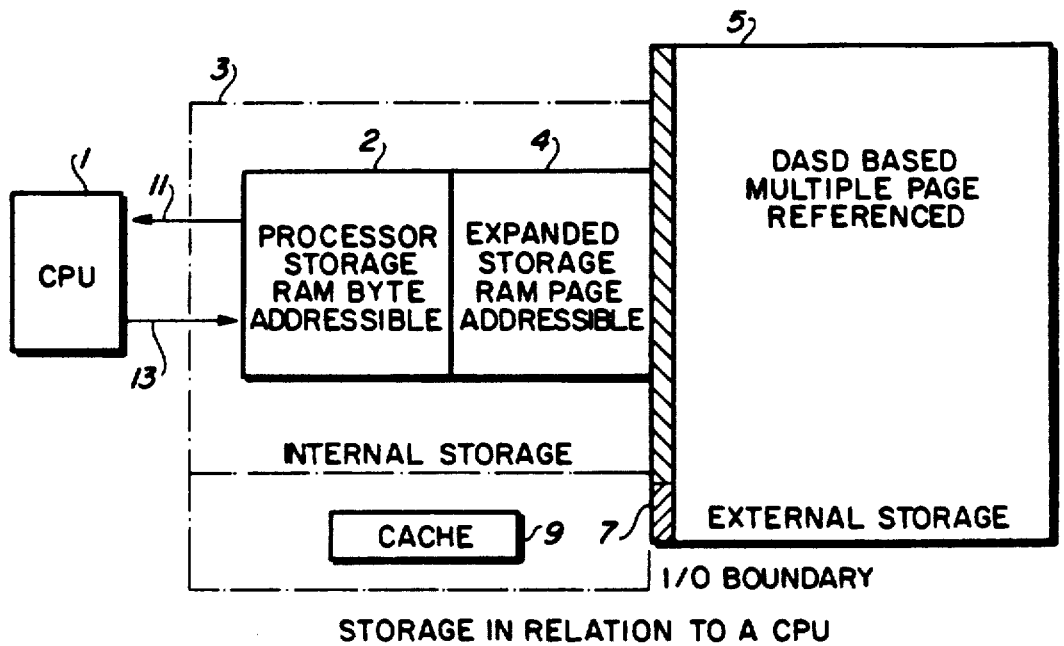
FIG. 1 sets out the organization of storage in relation to a large main frame CPU.

Referring now to FIG. 1, there is shown the relationship of organized storage to the CPU. As depicted, CPU 1 accesses both internal storage 3 and external storage 5 over paths 11 and 13. Internal storage 3 includes processor storage 2 whose contents are byte addressable and randomly accessible and expanded storage 4 whose contents are page addressable and randomly accessible. External storage 5 comprises one or more DASD and stores the page of the information referenced by applications executing on CPU 1.

Typically, an application invoking the CPU processor would reference a page by either its virtual/linear or real space address to a cache. In this regard, cache 9 could be hardware or software implemented. If software implemented, the cache could be located anywhere in internal storage 3. If the page is not available in cache 9, then either expanded storage 4 or external storage 5 need be accessed.

Where multiple pages are accessed across the I/O boundary 7 in external storage, they may be processed according to methods as set forth in the above-mentioned Luiz patent. Parenthetically, when an access is made to internal storage the processor waits until the access is completed. When access is made across the I/O boundary, the processor invokes another task or process while awaiting fetch (access) completion.

Attributes of the Global Lock Manager According to the Invention

The pith and marrow of this invention is the recognition that a global lock manager in a distributed system with a properly defined set of lock functions can achieve cache consistency as well as serialization of access. The functions and attributes of interest include shared and exclusive use locks, atomic change of lock state, enqueing of lock requests, and notification of lock grant and conflict to lock holders and requesters.

A shared use (read) lock state permits multiple concurrent holders but excludes concurrent exclusive (write/update) locks. If a shared lock cannot be granted to a requesting cache manager (processor), then the denial of grant will be communicated and the request will be enqueued for later grant.

An exclusive use lock state admits only a single holder and excludes all other shared or exclusive locks to the same page. If an exclusive lock cannot be granted to a requesting cache manager (processor), then the denial of grant will be communicated and the request will be enqueued for later grant.

An atomic change of lock state allows a lock holder to change the state of a lock without giving up the current lock state.

An enqueue facility permitting requests for lock manager services to be serially ordered as well as a notification or a conditional broadcast facility by which lock manager responses to change of lock state and conflict can be communicated to holders and requesters of the same page or resource.

Relations Between A Global Lock Manager and Local Cache Managers

Referring now, to FIGS. 2-11, there are depicted several relationships between the lock table 15 of a global lock manager resident in a first processor and local cache managers 17, 19, 21 located in counterpart CPU's (processors 1, 2, 3) in a distributed system. The lock manager records the lock state of the distributed system by way of resource name, lock type, and identity of the lock holder. The table must be updated by the lock manager every time the lock state of the system changes. Relatedly, each cache manager maintains a directory of page names resident in the cache and their last reference information. The latter is used in the LRU for aging out of one or more pages when the cache is full and new pages are swapped therein. Note, that pages are copied or refreshed into cache from shared external storage available on DASD 23 and 25 over path 27 coupling the DASD to the processors 1-3.

For purposes of this invention the lock manager could conveniently be located in processor 1. Also, communications between local cache managers in processors 2 and 3 with the lock manager in processor 1 could preferably be implemented by way of a "mail drop" in external storage. That is, an address in external storage would be routinely polled by the lock and cache managers for the transmission or reception of messages. A more expeditious method of communication would be to vary the definition of distributed or loosely coupled system by use of channel to channel adaptors to provide a direct path between CPU's as described in System 370 architecture as described in the Amdahl and Luiz patents and the references cited therein.

It should be appreciated that locks and their management can occur at various logical levels within a system. For example, locks at the application level for securing access, transaction processing, and varying granularity in a write-ahead logging relational database system is described in Crus et al; U.S. Pat. No. 4,716,528, "Method for Managing Lock Escalation in a Multi processing, Multi-programming Environment", filed Feb. 3, 1986, issued Dec. 29, 1987. The focus in this invention is data cache oriented page level locking and coherency in a distributed system.

The Method of the Invention Algorithmically Expressed

The method of the invention contemplates the following algorithmic measures:

(a) Whenever a page is to be read and cached:
1. Ascertain that the page is not in cache using the virtual external storage address (VESA) as the cache directory index order.
2. Obtain a shared use lock using VESA as the lock name.
3. If the lock is not granted, then wait for the signal indicating that it is granted.
4. Read the page into the cache and update the cache directory.
5. Pass the page to the application executing on the processor.

(b) Whenever a page is written and cached:
1. Obtain an exclusive use lock on the VESA. If the page is already cached the lock state must be atomically converted from shared to exclusive use.
2. If the lock was not immediately granted, then wait until it is granted. During this time other caches will be invalidated.
3. Place the contents of the page into the cache.
4. Write the new contents of the page to DASD backing store.
5. Change the lock state from exclusive to shared use. This must be atomic to ensure that another process concurrently seeking to update the same page is prevented from obtaining an exclusive lock during the change of lock state.

(c) Whenever a page is written and not cached:
1. Obtain an exclusive lock on the VESA.
2. If the lock was not immediately granted, then wait until it is granted. During this time other caches will be invalidated.
3. Write the new contents of the page to DASD backing store.
4. Change the lock state from exclusive to free.

(d) Whenever a page is discarded from a cache:
1. Discard the page and update the cache directory.
2. Relinquish the lock on the VESA.

(e) Whenever a page is requested and found within a cache:
1. Access the cache directory by VESA.
2. Copy the page to the requesting application.

(f) Whenever a notice of conflict is received by a holder of a share lock:
1. Access the cache directory by VESA and ascertain whether any other references are being processed with respect to the page of interest.
2. Wait until all active requests are completed.
3. Remove the page from the cache and cache directory.
4. Relinquish the lock on the VESA.

(g) Whenever a notice of conflict is received by a holder of an exclusive lock:
1. Access the cache directory by VESA and ascertain whether any other write references are being processed with respect to the page of interest.
2. Wait until the active write request is completed.
3. Remove the page from the cache and cache directory.
4. Relinquish the lock on the VESA.

Illustrative Example of the Method of the Invention

The method of this invention shall be illustrated by way of several read/write scenarios where in lock requests, actions and data movements will appear in successive depictions of the same lock table, cache manager, and shared external storage architecture. This can be appreciated by inspection of FIGS. 2-11.

Figure 2:
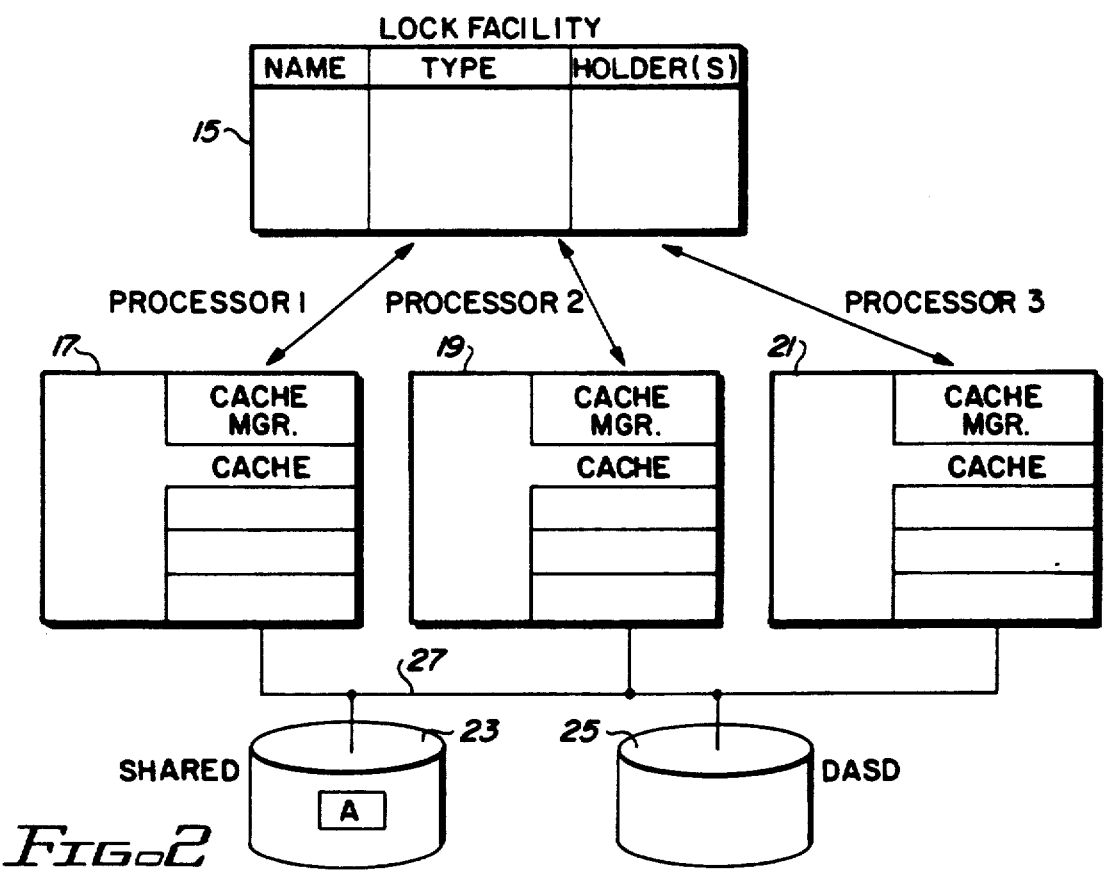
FIG. 2 depicts the relationships between the lock table of a global lock manager and local cache managers in a distributed system with respect to concurrency management of page access and cache invalidation of non-synchronous copies of a page.
Figure 3:
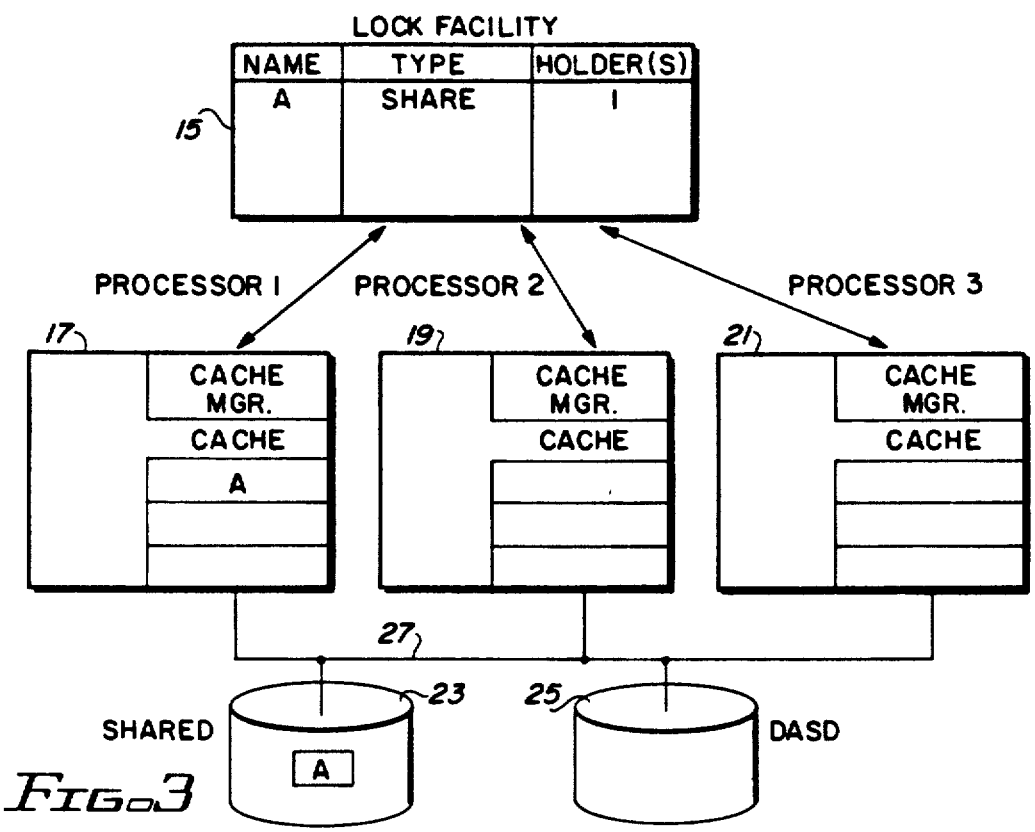
FIGS. 3–6 dynamically depict the lock manager and local cache manager page and lock states in the relationships shown in FIG. 2 as a function of an elementary lock request.

Referring now to FIG. 2, the global lock table and the directories of all the cache managers are presumed clear. Suppose, an application executing on processor 1 desires to read page A. Access to the directory maintained by cache manager 17 would reveal its absence. At this point, cache manager 17 would seek a share lock from the global lock manager. Upon the grant of the share lock on page A to processor 1 (cache manager 17), an entry is made into lock table 15. Thereupon, page A is swapped into the requesting cache from DASD 23 as shown in FIG. 3.

Figure 4:
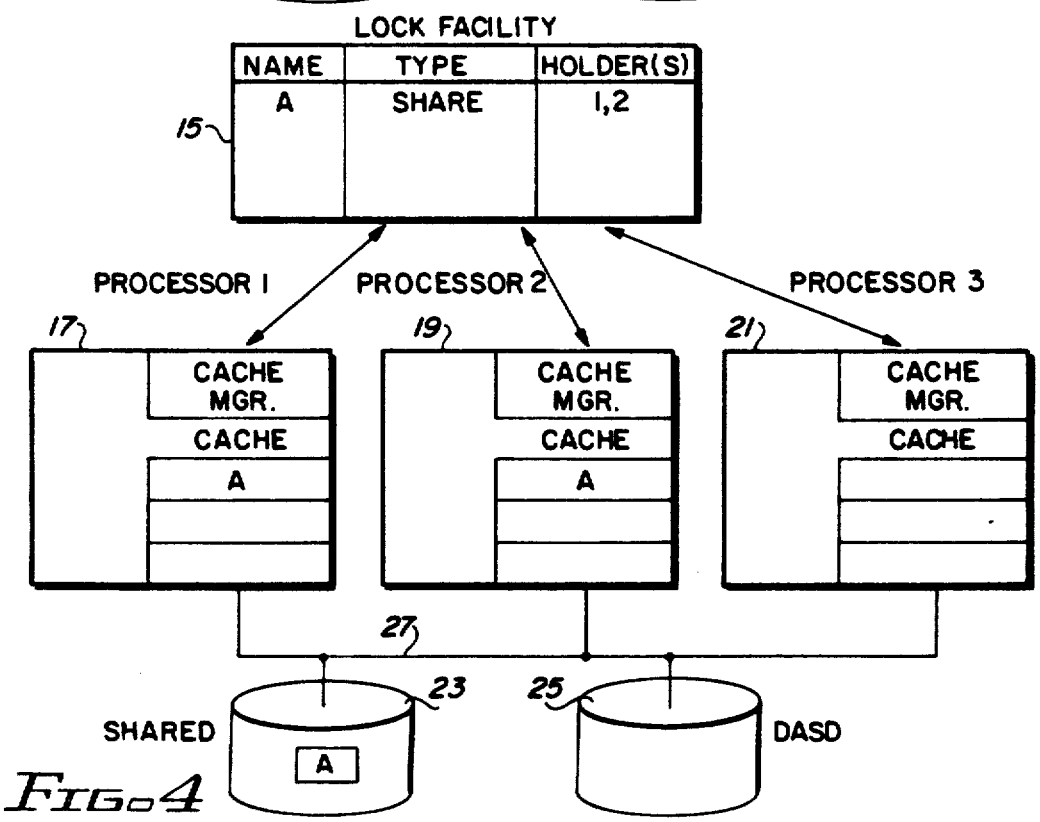
Figure 5:
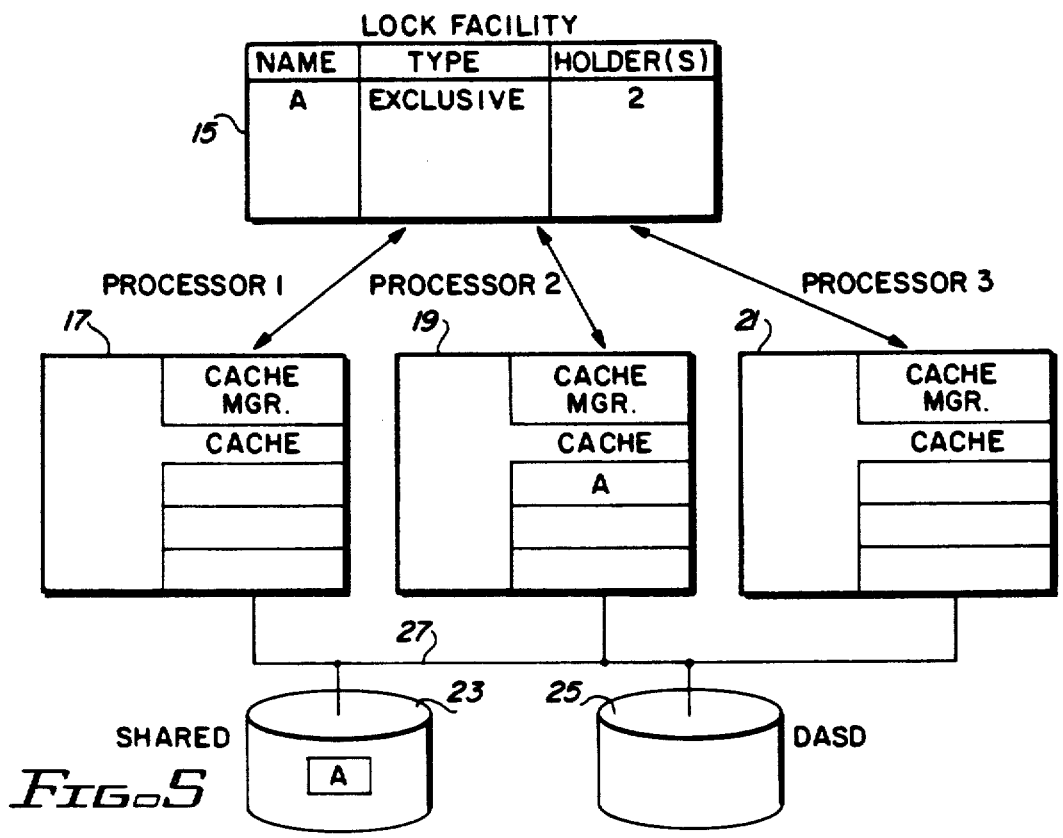

Let us now assume that an application running on processor 2 also desires to read page A. It likewise finds that page A is not in it local cache directory 19. The counterpart cache manager requests a share lock on A from the global lock manager. Upon the request being granted and entry modification made in the lock table 15, page A is likewise swapped into cache 19 from DASD 23. This is depicted in FIG. 4.

Next, assume that the application running on processor 2 intends to modify page A. The page is easily located in local cache 19. Concurrently, cache manager 19 requests an exclusive lock on page A by processor 2. Processor 2 in effect waits until the lock manager replies. The lock manager first notifies the cache manager 17 of processor 1 that there is a conflict with respect to page A. Processor 1 completes any processing and removes page A from the local cache 17 (cache invalidation) and releases its share lock on that page. At this point, the lock manager now grants an exclusive lock on page A to cache manager 19 of processor 2. The state of affairs is set out in FIG. 5.

Figure 6:
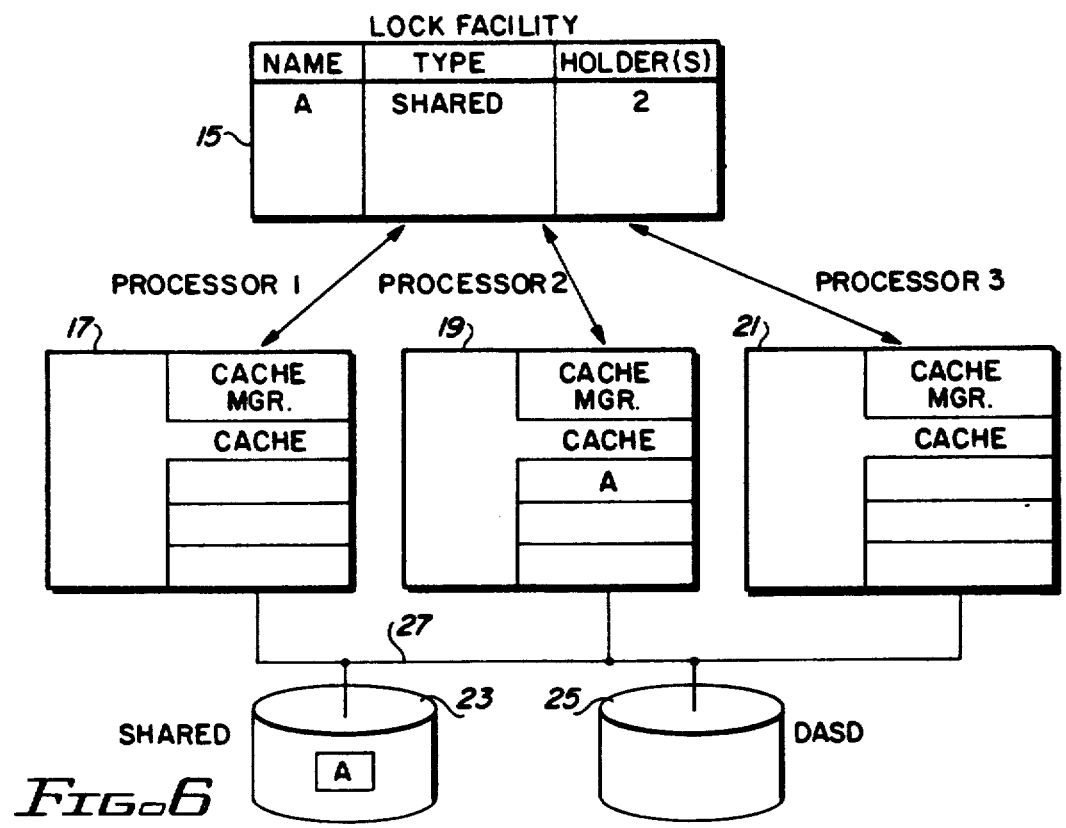

After this, processor 2 (by way of the application running thereon) modifies or updates page A and writes back the changed page to DASD and cache 19 of processor 2. The local cache manager 19 then requests the lock manager to demote the lock on page A from exclusive to shared. The state of affairs when the lock is demoted is shown in FIG. 6.

Figure 7:
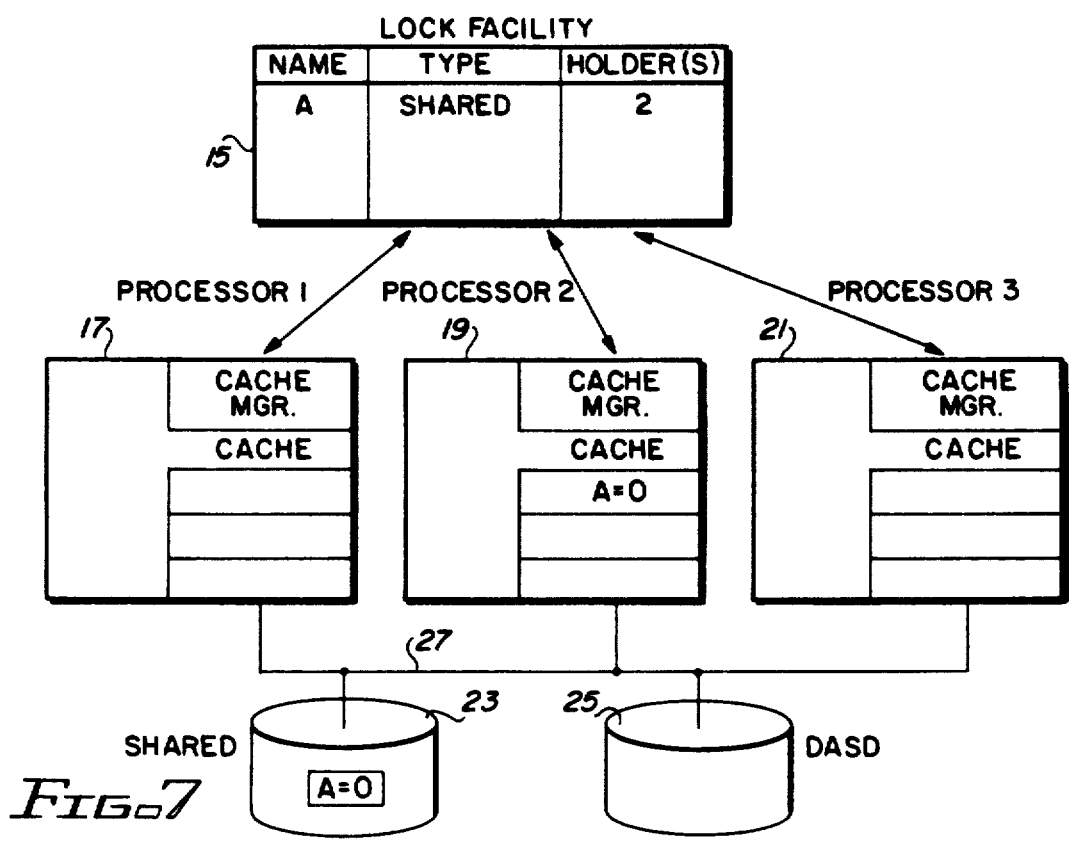
FIGS. 7-11 likewise dynamically depict the lock manager and local cache manager page and lock states in the relationships shown in FIG. 2 as a function of an advanced lock request.
Figure 8:
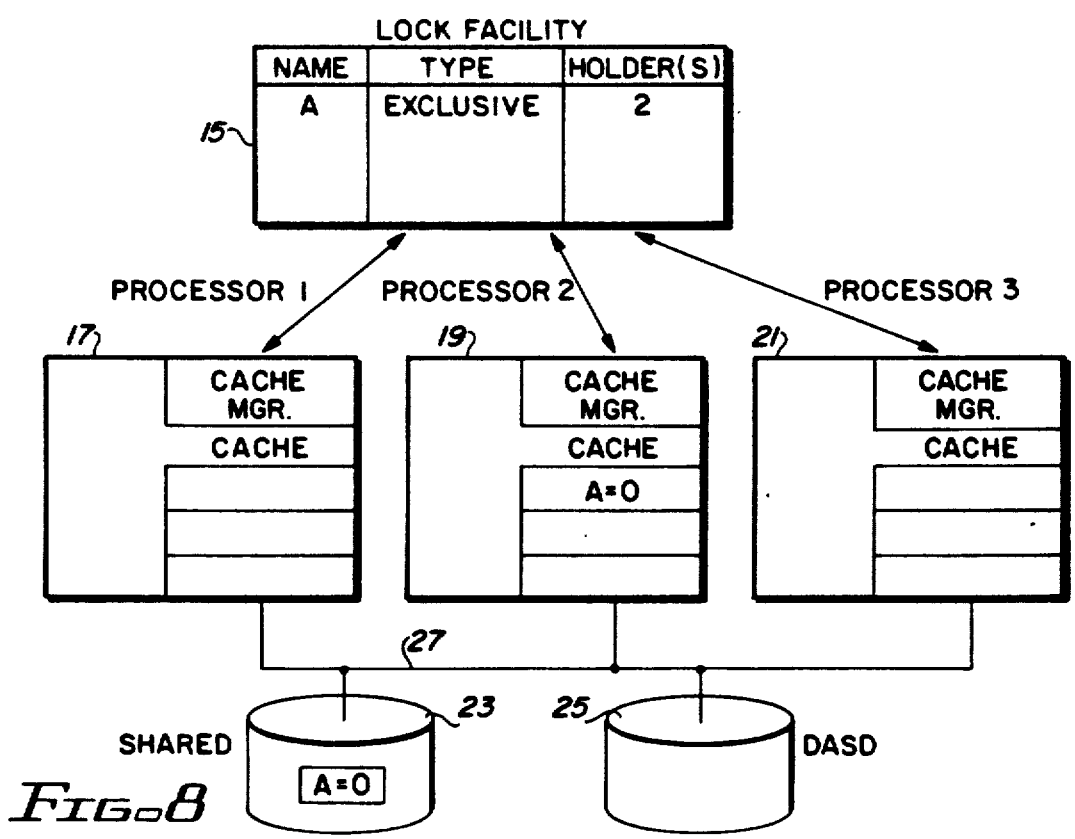
Figure 9:
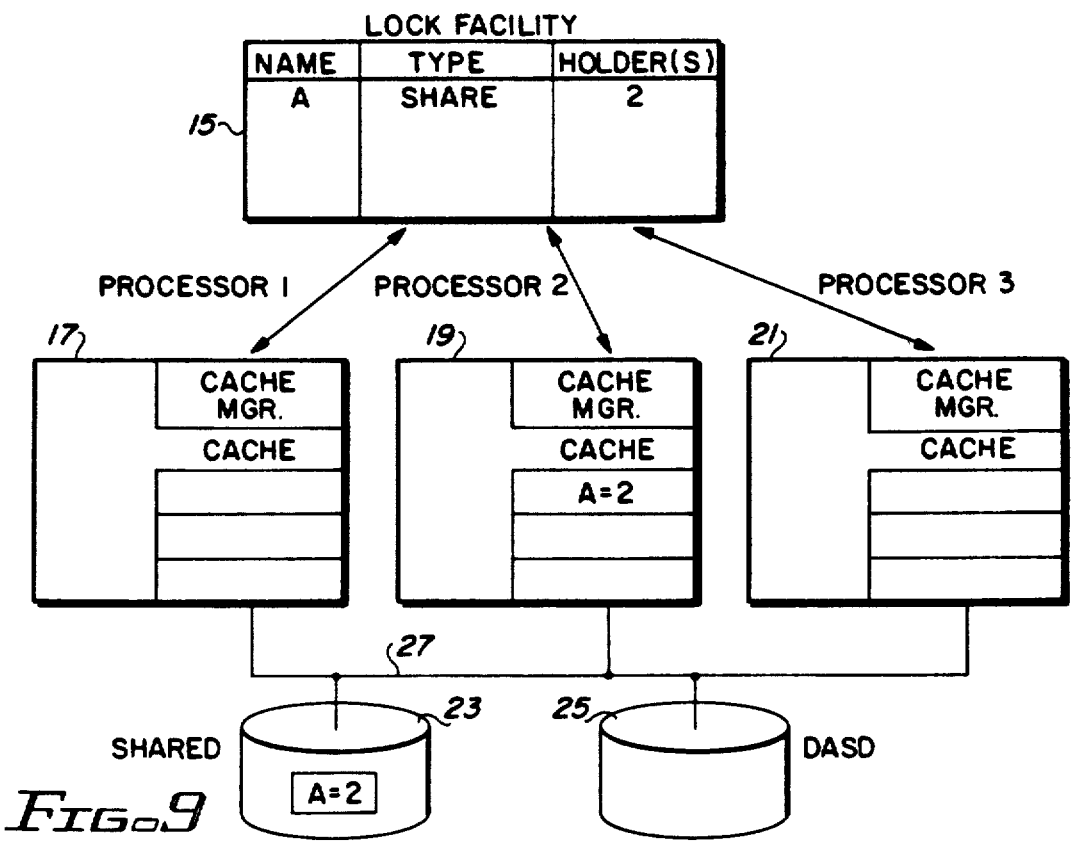

Still further, suppose that applications executing on processors 1 and 2 respectively intend to update page A to express different information. For instance, assume the current value of page A was a string of 0's. Also, suppose that processor 1 would rewrite page A to be a string of 1's while processor 2 would rewrite page A as a string of 2's. The initial state of affairs with processor 2 having a share lock on page A and cache having a copy of A as a string of O's is shown in FIG. 7.

The process starts with the assumption that cache 19 of processor 2 first requested promotion of its lock from shared to exclusive from the lock manager. (Note, a conflict message would be sent to all share lock holders. Since there are none in this example the step is omitted.) Processor 1's request for an exclusive lock is enqueued. Processor 2 lock request is then granted (state shown in FIG. 8). Thereupon, processor 2 writes page A as a string of 2's to cache 19 and to DASD 23. This is expressed in FIG. 9.

Figure 10:
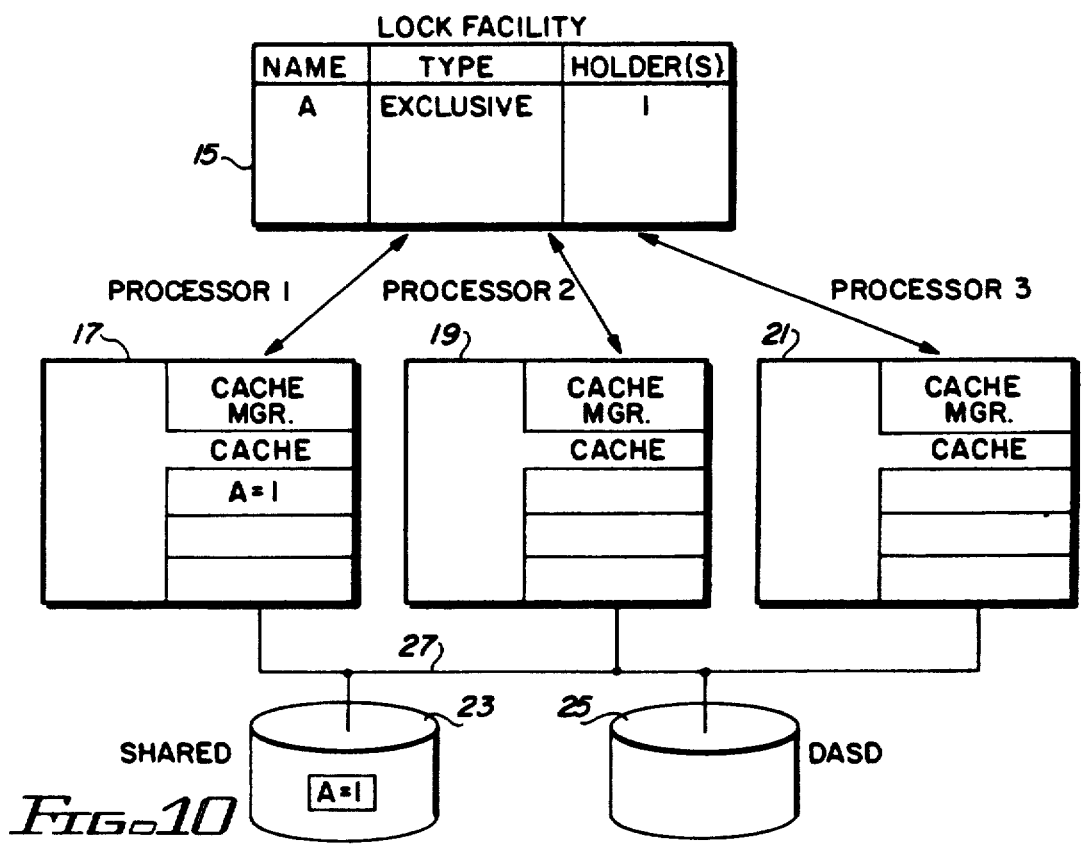
Figure 11:
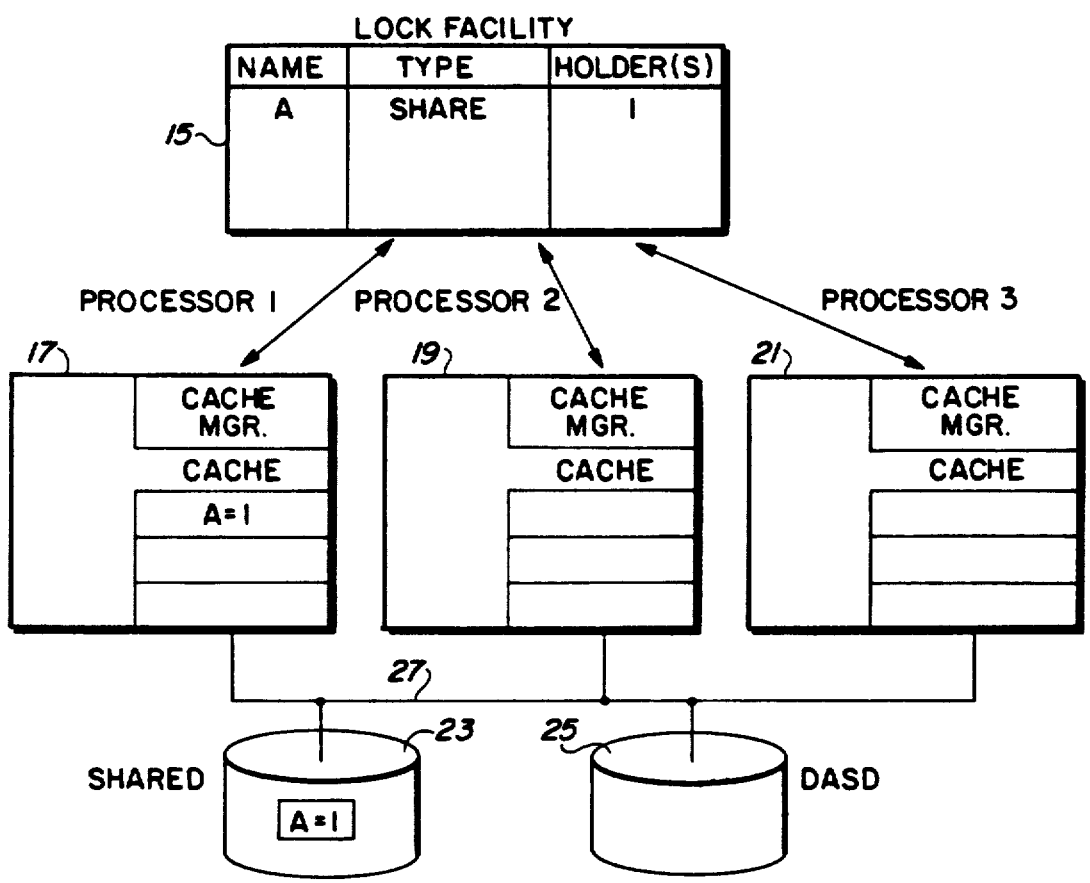

At this point, processor 2 secures demotion of its lock from exclusive to shared from the lock manager. Now, the lock manager processes the enqueued exclusive lock request from processor 1 and thereby notifies the cache manager 19 of processor 2 of the conflict over page A. Processor 2 then invalidates its copy of page A. Cache manager 17 of processor 1 is given an exclusive lock on page A. Thereupon, processor 1 writes page A as a string of 1's into its local cache and to DASD 23. Next, processor 1 secures demotion of its lock on page A from exclusive to shared. The states just described are depicted in FIGS. 10 and 11 respectively.

These and other extensions of the invention may be made without departing from the spirit and scope thereof as recited in the appended claims.

We claim:

1. A method for serializing access to and ensuring consistency among pages common to local caches in counterpart processors in a system having a shared external store, each processor having an operating system, internal store for programs and data pages, a local cache and cache manager, and means for executing programs located in said internal store and responsive to read and write instructions in said programs for causing the operating system to ascertain from said cache manager whether any pages designated in said read or right instructions are resident in said local cache, and in the absence thereof, for causing said operating system to access the shared external store and stage up to said local cache any copy of said designated pages resident in said shared external store, comprising the steps of:

(a) defining a lock manager by a predetermined one of the operating systems in a first processor over all resources in the system, said lock manager conditionally granting shared and exclusive locks, atomically changing its lock state, enqueuing requests for locks, notifying requesters of lock grant and all holders of a lock in conflict, said conditional granting being a grant or notification by said lock manager only to those cache managers of processors executing read or write instructions whose caches actually store or are in the process of staging up of pages designated by said instructions;

(b) responsive to each read instruction dispatched through the operating system of a requesting processor, obtaining a share lock on a designated page from the lock manager by the cache manager of the requesting processor, and either accessing the designated page in local cache of said requesting processor, or, copying said designated page into local cache of said requesting processor from the shared external store; and (c) responsive to each write instruction dispatched through the operating system of the requesting processor, notifying only those cache managers of processors other than the requesting processor who are holders of share locks on the designated page by the lock manager, removing copies of the designated page from the notified local caches (cache invalidated), relinquishing any share locks, granting an exclusive lock on the designated page to the cache manager of the requesting processor, writing a changed or replacement page through the local cache of the requesting processor to the shared external store, and demoting the lock state of the cache manager of the requesting processor from exclusive to shared.

2. The method according to claim 1, wherein the atomic changing of lock state includes the changing of the state of a lock by a current lock holder without relinquishing the current lock state such as enqueing on a request.

3. The method according to claim 1, wherein said method further comprises the step of ascertaining priority among concurrent write instructions generated by programs among the processors according to an extrinsic logical locking convention.

* * * * *

UNITED STATES PATENT AND TRADEMARK OFFICE
CERTIFICATE OF CORRECTION

PATENT NO. : 5,226,143

DATED : July 6, 1993

INVENTOR(S) : R. Baird, G. P. Bozman, A. S. Lett, J. J. Myers W. H. Tetzlaff

It is certified that error appears in the above-identified patent and that said Letters Patent is hereby corrected as shown below:

Column 9, line 25, delete "right" and insert --write--

Signed and Sealed this

Thirtieth Day of August, 1994

Attest:

BRUCE LEHMAN

Attesting Officer

Commissioner of Patents and Trademarks